United States Patent [19]
Bair et al.

[11] Patent Number: 5,167,015
[45] Date of Patent: Nov. 24, 1992

[54] LINE DRAWING METHOD AND APPARATUS

[75] Inventors: Chaur-Hwang Bair; Houng-Ching Shyu, both of Hsin; Chu-Fa Shyu, Maio; Yao-Sung Yang, Tainan, all of Taiwan

[73] Assignee: Industrial Technology Research Institute, Taiwan

[21] Appl. No.: 587,160

[22] Filed: Sep. 19, 1990

Related U.S. Application Data

[63] Continuation of Ser. No. 206,245, Jun. 13, 1988, abandoned.

[51] Int. Cl.⁵ ............................................. G06F 15/40
[52] U.S. Cl. .................................. 395/143; 395/141; 340/747
[58] Field of Search ... 364/518, 521, 522, 200 MS File, 364/900 MS File; 340/703, 747, 750, 798, 799; 395/141, 142, 143

[56] References Cited

U.S. PATENT DOCUMENTS

| | | | |
|---|---|---|---|
| 4,218,734 | 8/1980 | Ito | 364/118 |
| 4,553,214 | 11/1985 | Dettmer | 364/521 |
| 4,674,058 | 6/1987 | Lindbloom et al. | 364/518 |
| 4,677,575 | 6/1987 | Redin | 364/521 |

OTHER PUBLICATIONS

Rogers, F. D., "Procedural Elements for Computer Graphics", McGraw-Hill Book Company, 1985, pp. 29–42.

*Primary Examiner*—Gary V. Harkcom
*Assistant Examiner*—Phu K. Nguyen
*Attorney, Agent, or Firm*—Darby & Darby

[57] ABSTRACT

A highly efficient method of line drawing on a raster scan display device. By properly shifting the original coordinates, a line can be represented by an equation such as $X=(Q+r/\Delta Y)Y$ if the slope ($\Delta Y/\Delta X$) is between 0 and 1. Q and r are the integer quotient and remainder, respectively, when $\Delta X$ is divided by $\Delta Y$. An error term D and a MODIFIER term are determined in accordance with the proposed algorithm for each value of Y. The final line is formed when the positions of ($\Delta Y+1$) line segments, with different numbers of horizontal points in each line segment, are determined. By this technique, when the quotient Q is odd, the number of points to be drawn for the first line segment are $(Q+1)/2$ and the points of the rest of the line segments are Q+MODIFIER. When the quotient Q is even, the points of the first line segment are $Q/2$ when $r=0$, or $(Q/2)+1$ when r not equal to 0. The points of the remaining line segments are Q+MODIFIER. If the slope of line to be drawn lies between 1 and infinity, the technique can still be advantageously applied by simply interchanging the X and the Y in the above equation. Accordingly, it is only necessary to calculate each horizontal line segment corresponding to each Y coordinate value instead of each X coordinate value. This greatly simplifies the process and reduces the time of calculation as compared with the conventionally used Bresenham's algorithm.

4 Claims, 5 Drawing Sheets

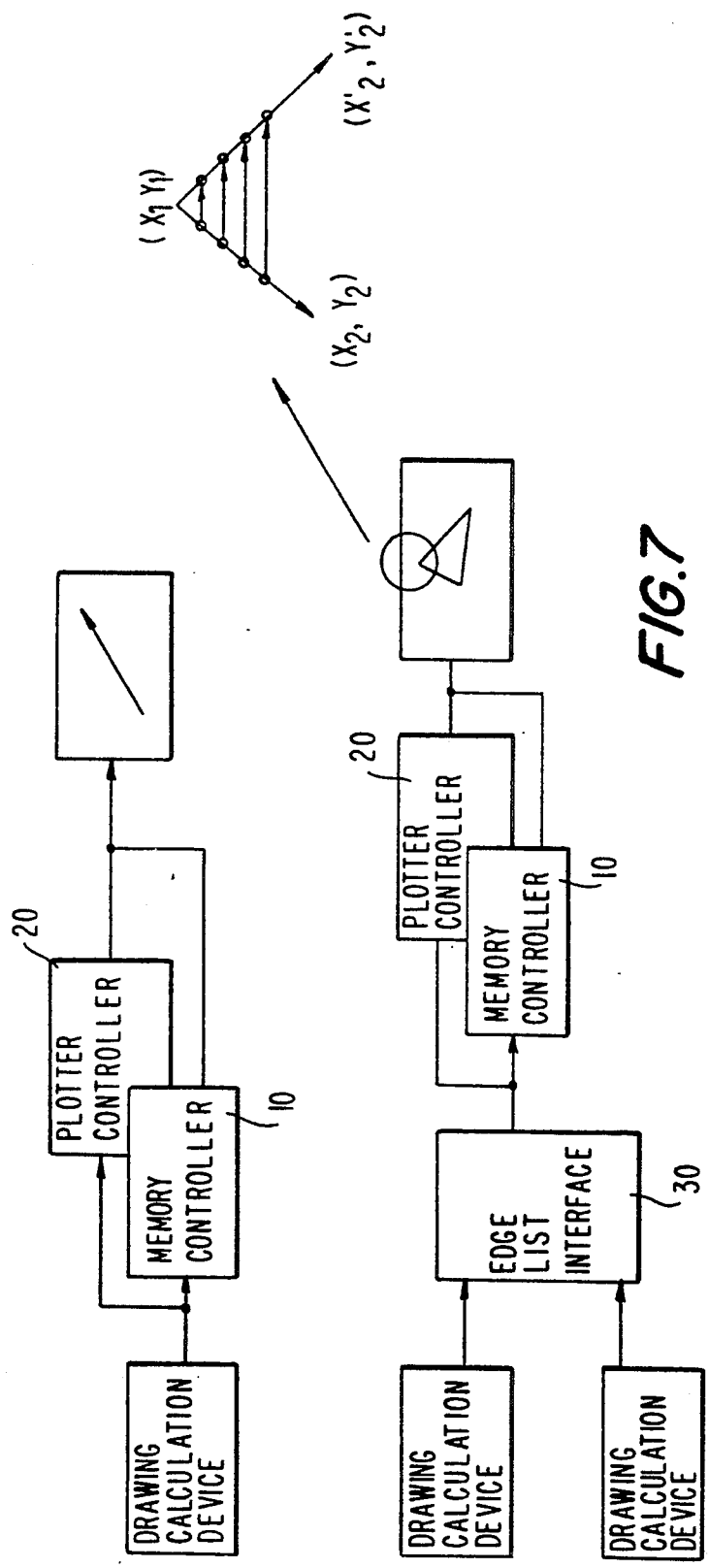

LINE DRAWING METHOD AND APPARATUS

This is a continuation of application Ser. No. 07/206,245, filed Jun. 13, 1988, now abandoned.

BACKGROUND OF THE INVENTION

In computer graphics, bits are stored in memory to represent coordinates in the display plane. A line segment in the display is formed by a number of discrete points. Currently, a line is calculated by means of the parameters determined from the line equation according to the Bresenham's algorithm. The disadvantage of this method is that one has to calculate each point in succession and the number of calculations is proportional to the length of the line. The basic operation of the Bresenham's algorithm is illustrated in FIG. 1 and the calculation shown below for a line between the points (0,0) and (40,6) in plane coordinate. The following sets of parameters and equations are used:

```
Let   X = (40 - 0) = 40, and
      Y = (6 - 0) = 6.
Define D = 2Y - X = -28, and
       D1 - 2Y = 12, and
       D2 = 2(Y - X) = -68.
      If D < 0, then D becomes D + D1 and Y becomes Y + 0.
      If D ≧ 0, then D becomes D + D2 and Y becomes Y + 1.
```

X is incremented by 1 in each series of calculations. In total, the calculation must be performed 40 times.

The results of the calculation are shown in Table 1 and FIG. 2.

TABLE 1

| Parameter Values | | | Pixel Coordinates | | Length of Segment Where Y is Fixed Value |
|---|---|---|---|---|---|
| D | D1 | D2 | X | Y | |
| −28 | 12 | −68 | 0 | 0 | |
| −16 | 12 | −68 | 1 | 0 | 4 |
| −4 | 12 | −68 | 2 | 0 | |
| +8 | 12 | −68 | 3 | 0 | (D ≧ 0) |
| −60 | 12 | −68 | 4 | 1 | |
| −48 | 12 | −68 | 5 | 1 | 6 |
| −36 | 12 | −68 | 6 | 1 | |
| −24 | 12 | −68 | 7 | 1 | |
| −12 | 12 | −68 | 8 | 1 | |
| 0 | 12 | −68 | 9 | 1 | (D ≧ 0) |
| −68 | 12 | −68 | 10 | 2 | |
| −56 | 12 | −68 | 11 | 2 | 7 |
| −44 | 12 | −68 | 12 | 2 | |
| −32 | 12 | −68 | 13 | 2 | |
| −20 | 12 | −68 | 14 | 2 | |
| −8 | 12 | −68 | 15 | 2 | |
| +4 | 12 | −68 | 16 | 2 | (D ≧ 0) |
| −64 | 12 | −68 | 17 | 3 | |
| −52 | 12 | −68 | 18 | 3 | 7 |
| −40 | 12 | −68 | 19 | 3 | |
| −28 | 12 | −68 | 20 | 3 | |
| −16 | 12 | −68 | 21 | 3 | |
| −4 | 12 | −68 | 22 | 3 | |
| +8 | 12 | −68 | 23 | 3 | (D ≧ 0) |
| −60 | 12 | −68 | 24 | 4 | |
| −48 | 12 | −68 | 25 | 4 | 6 |
| −36 | 12 | −68 | 26 | 4 | |
| −24 | 12 | −68 | 27 | 4 | |
| −12 | 12 | −68 | 28 | 4 | |
| 0 | 12 | −68 | 29 | 4 | (D ≧ 0) |
| −68 | 12 | −68 | 30 | 5 | |
| −56 | 12 | −68 | 31 | 5 | 7 |
| −44 | 12 | −68 | 32 | 5 | |
| −32 | 12 | −68 | 33 | 5 | |
| −20 | 12 | −68 | 34 | 5 | |
| −8 | 12 | −68 | 35 | 5 | |
| +4 | 12 | −68 | 36 | 5 | (D ≧ 0) |
| −64 | 12 | −68 | 33 | 6 | |
| −52 | 12 | −68 | 38 | 6 | 4 |
| −40 | 12 | −68 | 39 | 6 | |
| −28 | 12 | −68 | 40 | 6 | END |

The above table illustrates the complexity of the process where Bresenham's algorithm is used. It is apparent that the longer the length of the line, the longer time the process takes.

SUMMARY OF THE INVENTION

This invention relates to a method and apparatus for drawing a line in a raster scan display device which determines the number of points for each line segment corresponding to each Y coordinate. Those line segments contiguous at the succeeding Y coordinate value approximate the desired line on the display device.

Between two points (X1,Y1) and (X2,Y2), the slope of a line equals $\Delta X/\Delta Y$, i.e., $(X2-X1)/(Y2-Y1)$, and can be expressed by the quotient Q and the remainder $r/\Delta Y$. By means of a novel algorithm, an ERROR term (D) is calculated by the value of r and $\Delta Y$ and a MODIFIER term determined from the ERROR (D) term.

When the quotient Q is odd, the number of points constituting the first line segment is $(Q+1)/2$ and the number of points for the rest of the line segments is Q+MODIFIER. If the quotient Q is even, the number of points of the first line segment is $Q/2$ when $r=0$, or $Q/2+1$ when r not equal to 0, and the number of points for the rest of the line segments is Q+MODIFIER.

The feature of this invention is that it is only necessary to calculate the positions of the starting and ending points of line segments instead of each point, thus reducing the calculation time. In addition, the deviation in the Y coordinate direction between the displayed point and the real point of the line is maintained at less than ±0.5 of the Y coordinate unit scale.

DESCRIPTION OF THE DRAWINGS

FIG. 6 illustrates a graphic representation of a straight line drawing utilizing one device as shown in FIG. 4.

FIG. 7 illustrates a filled polygon drawing utilizing two of the devices as shown in FIG. 4.

DESCRIPTION OF A PREFERRED EMBODIMENT

As noted above, any line to be drawn can be expressed as $Y=(\Delta Y/\Delta X)X$ or $X=(\Delta X/\Delta Y)Y$. If its line slope is between 0 and 1, then $\Delta X$ is greater than $\Delta Y$.

Therefore, $X=(\Delta X/\Delta Y)Y$ can be reduced to the following expression:

$$X=(Q+r/\Delta Y)Y \quad (1).$$

where X,Y are real numbers. In order to draw a line in a raster scan device through discrete pixels, the (X,Y) coordinates must be integers.

Equation (1) may be further approximated to $\overline{X}=(Q+r/\Delta Y)\overline{Y}+\text{ERROR}$, where the $\overline{Y}$ and $\overline{X}$ are integers. Assume that $\overline{Y}$ is an integer n; then $n-\frac{1}{2} \leq Y < n+\frac{1}{2}$. Therefore, the range of the X is:

$$(n-\tfrac{1}{2})Q+(n-\tfrac{1}{2})r/\Delta Y \leq X < (n+\tfrac{1}{2})Q+(n+\tfrac{1}{2})r/\Delta Y \quad (2)$$

Assume n=0, then:

$$-\tfrac{1}{2}Q-(\tfrac{1}{2})r/\Delta Y \leq X < \tfrac{1}{2}Q+(\tfrac{1}{2})r/\Delta Y \quad (3)$$

Equation (3) suggests that the number of points in the direction of X coordinate for a given Y will be Q or Q+1.

The line to be drawn into $(\Delta Y+1)$ segments is approximated simply by calculating the number of points in the X direction for each $\Delta Y+1$ line segments. Based on this algorithm, only $\Delta Y+1$ calculations are required. This may be much less than X calculations.

From Inequality (3) it can be seen that there are no Q points in the first line segments because the left-hand term does not exist. Therefore, there are only (Q/2) or (Q/2)+1 points. Similarly, for the last line segment, the right-hand term of the inequality does not exist.

Based on the above-mentioned relationships and the Bresenham method, the lengths of the line segments are summarized in Table 2 below:

TABLE 2

|  | Q: odd | Q: even |
|---|---|---|
| First line Segment | (Q + 1)/2 | Q/2 (r = 0)<br>(Q/2) + 1 (r ≠ 0) |
| Rest line Segments | Q + MODIFIER | Q + MODIFIER |

The MODIFIER term is 1 or 0 depending on the ERROR term of each line segment. With the assistance of Table 2 and the Inequality (3), the initial value of the error term (D) can be determined by the following rule:

When Q is odd, $D=r/2-\Delta Y/2$.
When Q is even, $D=r/2-\Delta Y$.

In the subsequent calculation for each line segment, r is added to D and then compared with 0.

If $D>0$, then the MODIFIER=1, and $D=D-\Delta Y$.

If $D<0$, the MODIFIER=0. For facilitating the above comparison, all parameters are multiplied by two. The rule then becomes:

When Q is odd, $D=r-\Delta Y$.
When Q is even, $D=r-2\Delta Y$. During the calculation, 2r is added to D and the sum will be compared to 0. If $D \leq 0$, then the MODIFIER=0. If $D>0$, $2\Delta Y$ is subtracted from D and the MODIFIER becomes 1.

To illustrate the advantages of the invention, two examples are provided.

EXAMPLE 1

Figure 1:
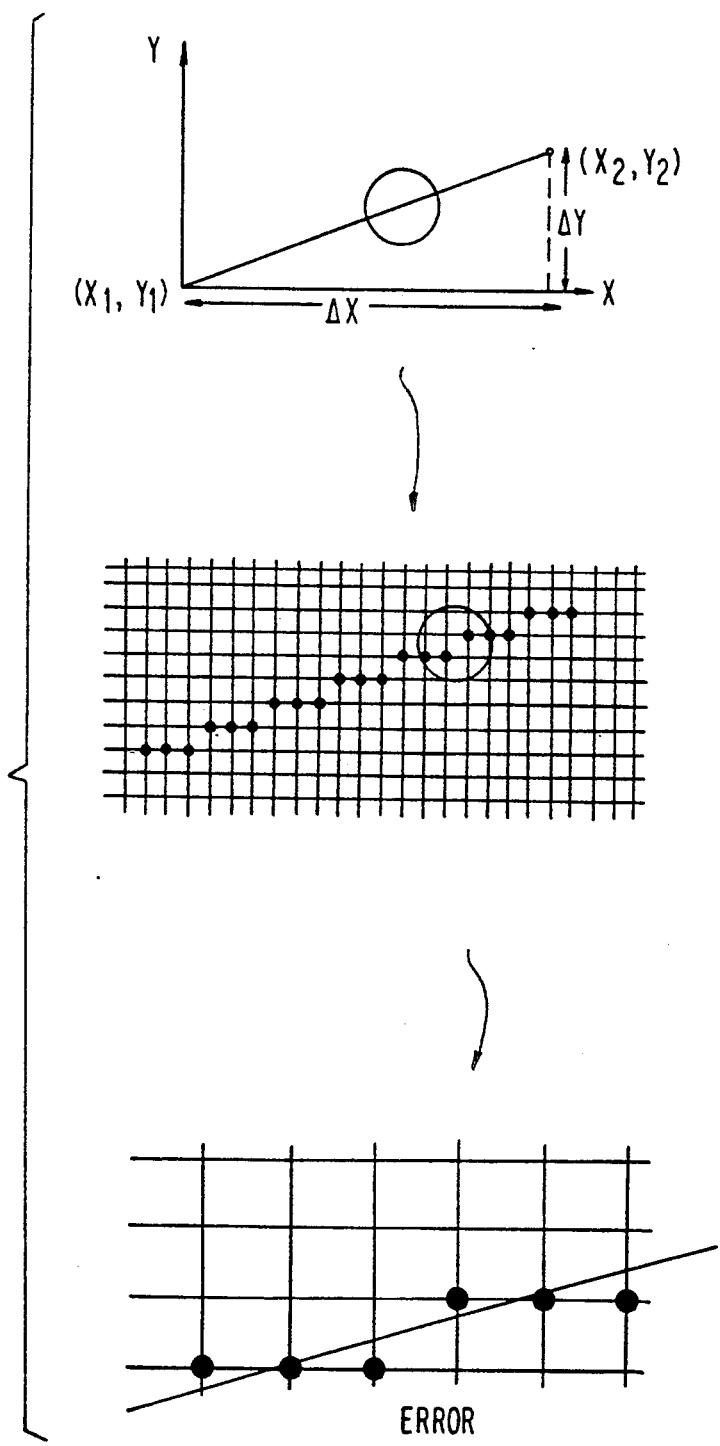
FIG. 1 shows graphically the prior methods of line drawing.
Figure 2:
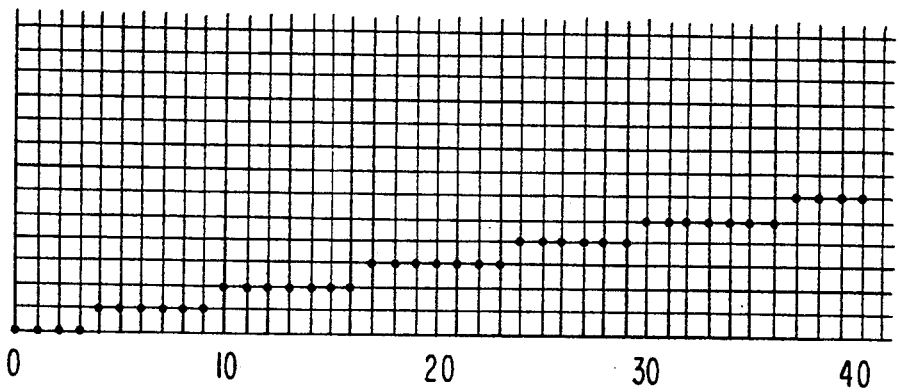
FIG. 2 illustrates the result of the point by point calculation based on the method shown in FIG. 1 for a line from coordinates (0,0) to (40,6).

For drawing a line between points (0,0) and (40,6)
Initially, let $\Delta X = 40$ $\Delta Y = 6$ $X=(6+4/6)Y,$ $Q=6, r=4$ $2\Delta Y = 12$ $2r = 8$ Referring to Table 2, since Q is even and r not equal to 0, the number of points of the first line segment is $Q/2+1=4$. The rest of the line segments are Q+MODIFIER; $D=r-2\Delta Y=4-12=-8$. Following the above rules, 2r is added to $\Delta$ and then compared with 0. This sets the MODIFIER term to 0. The same procedure is repeated for each consecutive value of Y. The results of these calculations is shown in Table 3 and in FIG. 2.

TABLE 3

| Y | Number of Points of Each Line Segment | Error | Modifier |
|---|---|---|---|
| 0 | 4 (Q/2 + 1) | −8 + 8 = 0 (D + 2r) | 0 |
| 1 | 6 (Q + MODIFIER) | 0 + 8 − 12 = −4 (0 + 2r − 2ΔY) | 1 |
| 2 | 7 (Q + MODIFIER) | −4 + 8 − 12 = −8 (−4 + 2r − 2ΔY) | 1 |
| 3 | 7 (Q + MODIFIER) | −8 + 8 = 0 (−8 + 2r) | 0 |
| 4 | 6 (Q + MODIFIER) | 0 + 8 − 12 = −4 (0 + 2r − 2ΔY) | 1 |
| 5 | 7 (Q + MODIFIER) | −4 + 8 − 12 = −8 (−4 + 2r − 2ΔY) | 1 |
| 6 | 4 | | |
|  | 41 | | |

This method requires 6 sets of calculations in contrast to the 40 needed when the Bresenham method is utilized.

EXAMPLE 2

For drawing a line between points (0,0) and (1000,2)
Initially, let:

$\Delta X = 1000 - 0 = 1000$ $\Delta Y = 2 - 0 = 2$ $Q+r/\Delta Y = \Delta X/\Delta Y = 500$ $Q = 500$ $r = 0$ $2r = 0$ $2\Delta Y = 4$ $D = r - 2\Delta Y = -4$ Referring to Table 2, the number of points of the first line segment are $Q/2=250$, since Q is even and r=0. The number of points of other line segments are listed in the following table:

TABLE 4

| Y | Number of Points of Each Line Segment | Error | Modifier |
|---|---|---|---|
| 0 | 250 | $-4 + 0 = -4$ | 0 |
| 1 | 500 | $-4 + 0 = -4$ | 0 |
| 2 | 251 | | |
|   | 1001 | | |

In this example, only two sets of calculations are required, while the Bresenham method needs 1000!

When the slope of the line to be drawn is between 1 and infinity, the method can still apply by interchanging X and Y in the calculation process.

Figure 4:
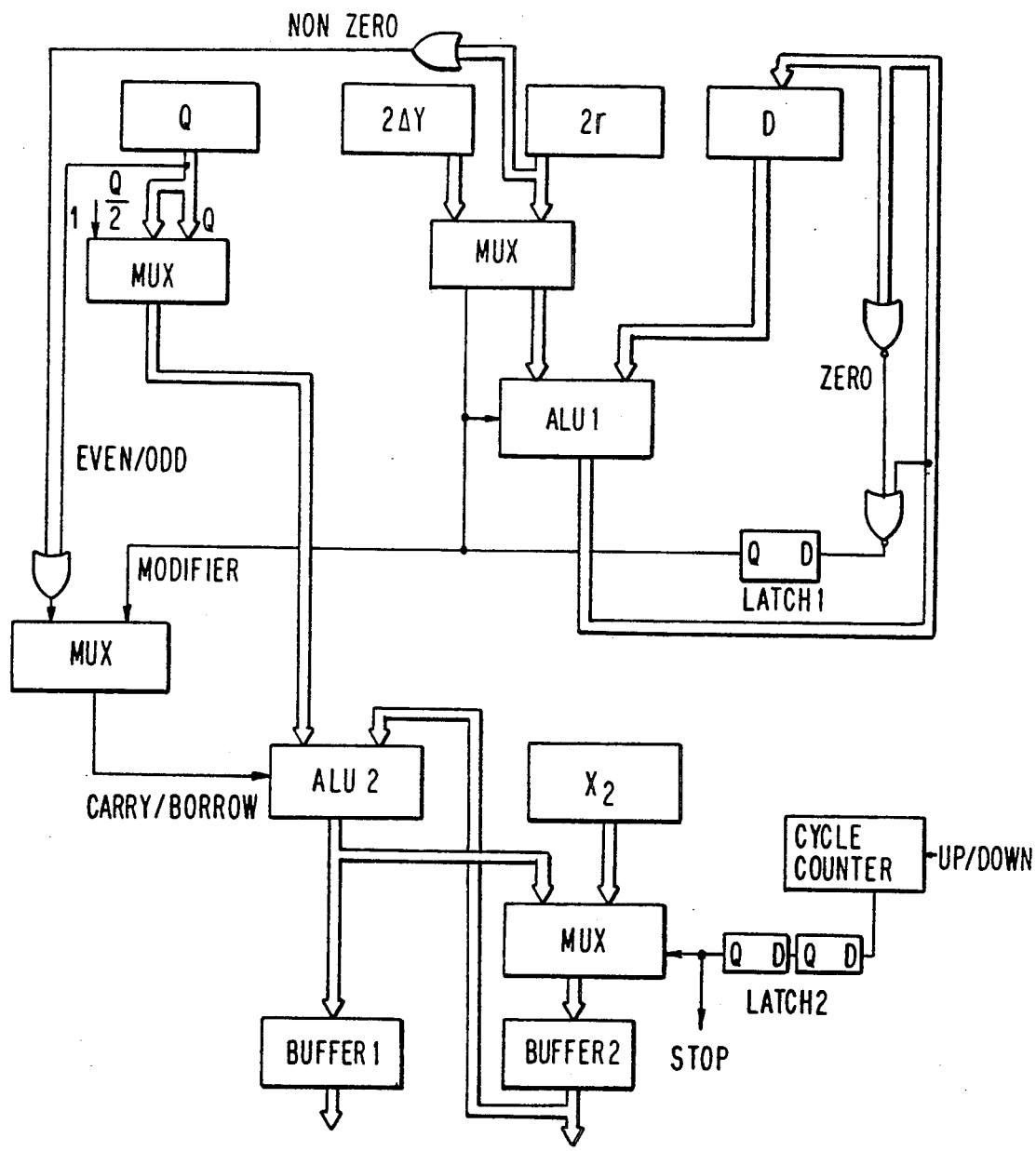
FIG. 4 is a block diagram of the basic elements of a device which may be used to implement the invention.

FIG. 4 shows the major building blocks of the apparatus of the invention. The device completes the calculation of each line segment in two clock cycles. The values of D, 2r, 2ΔY, Q, as defined above, are calculated and loaded into the registers shown on the top of the block diagram and the process proceeds as follows:

(a) The CYCLE COUNTER can count up or down. When ΔY>0 (that is Y2>Y1), the CYCLE COUNTER counts down and, if ΔY<0 (that is, Y2<Y1), it counts up. It counts once in CLOCK 2. When the count reaches 0, LATCH 2 receives a 1 and sends the value X2 to the BUFFER2 and the counting is completed.

Figure 3:
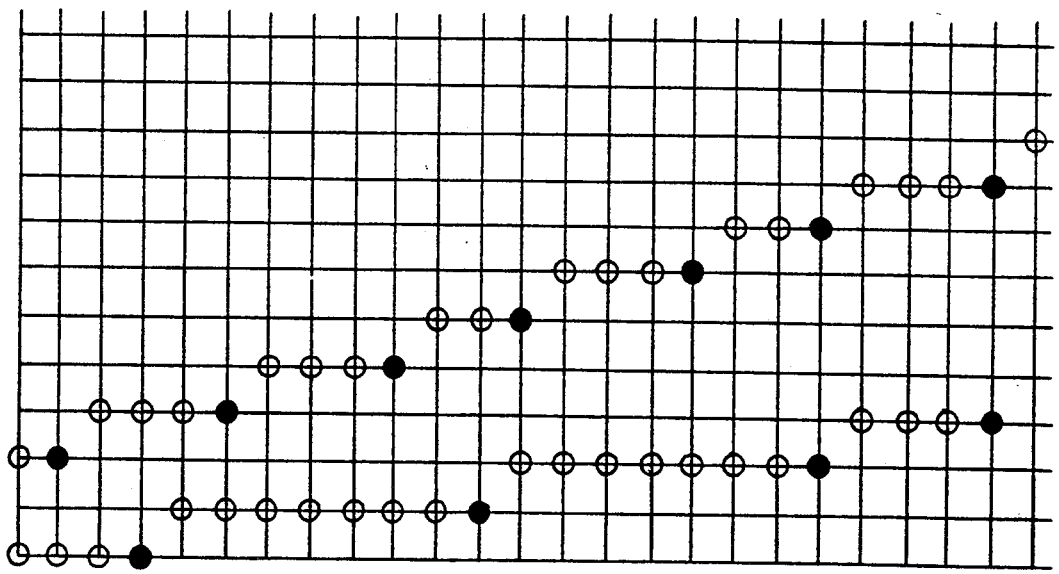
FIG. 3 illustrates graphically the end point and line segment determined by each calculation in accordance with the invention.

(b) BUFFER2 has the initial value X1−1 (when ΔX≧0) or X1+1 (when ΔX<0), and outputs the last point of each line segment (the black points on FIG. 3).

(c) BUFFER1 has no initial value. During every calculation cycle it outputs the first point of the next line segment (the starting points in FIG. 3).

(d) ALU 1 executes the addition and subtraction operations. At CLOCK 1, 2r is added to D and the output is saved in the register D. It also takes the MODIFIER from LATCH 1 (D>0, MODIFIER=1) at CLOCK 2. If the MODIFIER=1, then 2ΔY is subtracted from D. There is no action at CLOCK 2 if the MODIFIER=0.

(e) ALU 2 also executes addition and subtraction operations.

1. For the first line segment (refer to Table 2): At CLOCK 1, the value of BUFFER2 adds 1 or subtracts 1 (depending on the positive or negative sign of ΔX), and the total is saved in BUFFER1. At CLOCK 2, the value in BUFFER2 adds or subtracts Q/2 and adds or subtracts 1, as is appropriate, and the value is saved in BUFFER2.

2. For the remainder of the line segments: At CLOCK 1, 1 is added to or subtracted from the value of BUFFER2 (depending on the positive or negative sign of ΔX) in the ALU 2 and the value saved in BUFFER1. At CLOCK 2, Q is added to or subtracted from the value of BUFFER2, as is appropriate, and the MODIFIER added. The value is saved in BUFFER2.

3. For the last line segment: At CLOCK 2, the LATCH 2 prevents the value of ALU 2 from being sent to the BUFFER2. Instead, the value from the X2 is sent to BUFFER2.

The output values in BUFFER1 and BUFFER2 are sent to memory or a display device. e.g., monitor, a printer or a plotter.

Figure 5:
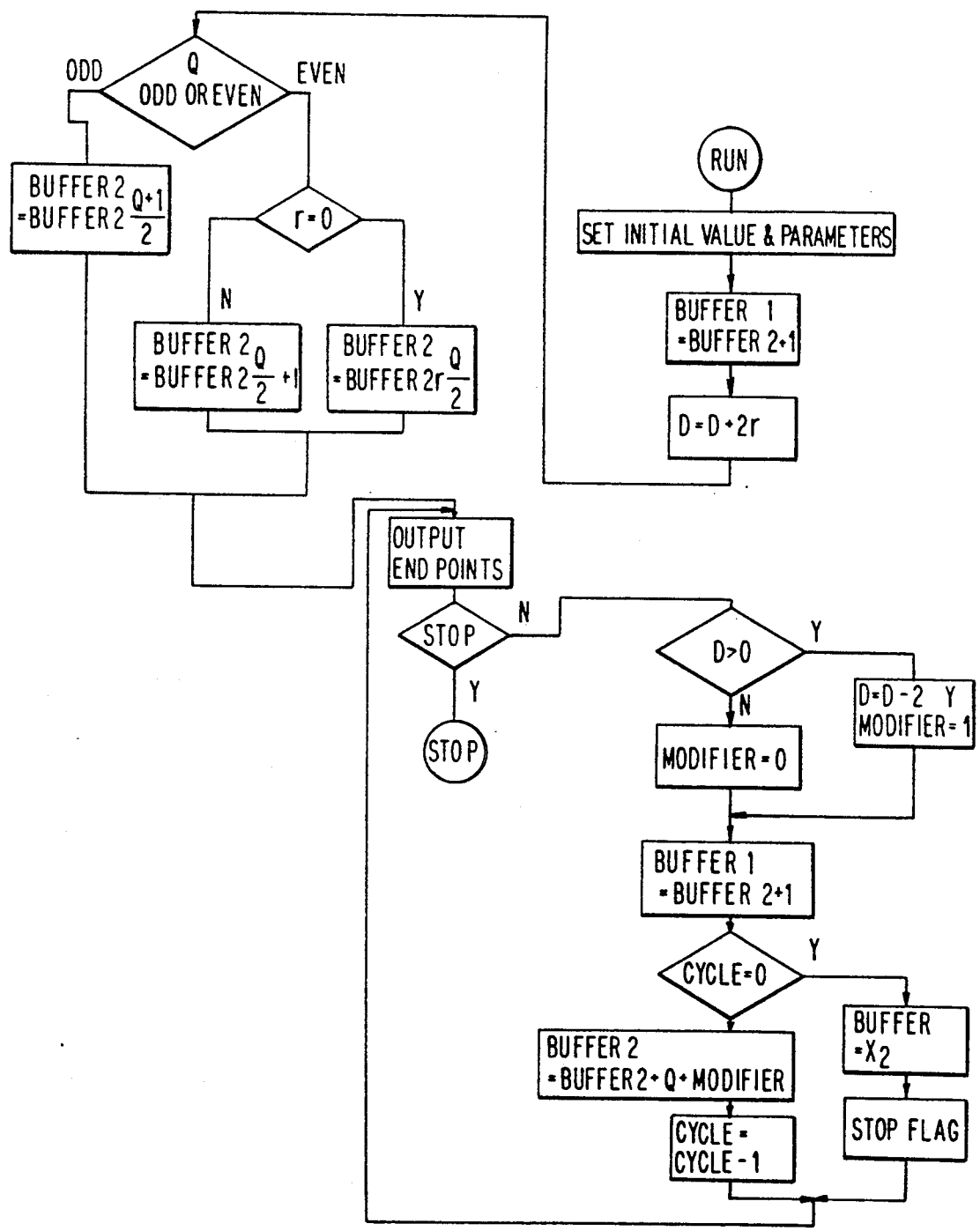
FIG. 5 is a flow chart of software which may be used to simulate the device shown in FIG. 4.

The flow chart shown in FIG. 5 describes the software needed to simulate the device. In view of the conventional format of the flow chart and the description of the invention set forth above, one skilled in the art will readily appreciate the information provided without further discussion.

In the industrial application of this invention, one can connect one calculation device for drawing a straight line or two calculation devices for drawing a filled polygon. This is generally depicted in FIG. 6 and FIG. 7. In FIG. 6, the input of the MEMORY CONTROLLER 10 or PLOTTER CONTROLLER 20 is connected to the output of the drawing calculation device. The MEMORY CONTROLLER 10 and PLOTTER CONTROLLER 20 can store all points between the starting and ending points of one line segment for the purpose of drawing one straight line on a DISPLAY DEVICE such as a monitor or printer. To obtain a polygon, the MEMORY CONTROLLER 10 is connected to an EDGE LIST INTERFACE 30 for locating the relative points of two outlines. The MEMORY CONTROLLER 10 stores all points between relative points to display the polygon.

While the invention has been particularly shown and described with reference to preferred embodiments thereof, it will be understood by those skilled in the art that various changes may be made without departing from the spirit and scope of the invention.

What is claimed is:

1. Apparatus for a drawing a straight line between two points $(X_1, Y_1)$ and $(X_2, Y_2)$ when $\Delta X > \Delta Y$, where $\Delta X = X_2 - X_1$ and $\Delta Y = Y_2 - Y_1$, on a raster scan display device, comprising:

(a) slope computing means for calculating the slope $\Delta X/\Delta Y$ of the line in terms of a quotient Q and a remainder $(r/\Delta Y)$, including first memory means for storing three operating parameters, Q, 2r, 2ΔY in three registers, respectively in a first memory location;

(b) means for determining the number of points in the first line segment, where Q is odd by the formula $(Q+1)/2$, where Q is even and $r=0$ by $Q/2$, and where Q is even and r not equal to 0 by $Q/2+1$, including second memory means storing a Y coordinate $Y_1$ of the first line segment and the number of points in a second memory location;

(c) means for determining the number of points in the remainder of the line segments according to the formula Q+modifier, where for each such line segment the modifier is determined from an error term, D, determined according to the following procedure:

where Q is odd, $D = r - \Delta Y$,
    where Q is even, $D = r - 2\Delta Y$,
    and then if $D > 0$ the modifier=1 and if $D \leq 0$ the modifier=0;

(d) third memory means for storing a Y coordinate and the number of points for each line segment in additional memory locations; and (e) means responsive to the contents of said second memory location and additional memory locations for controlling said raster scan display device, said means for controlling causing said display device to advance vertically to a point corresponding to coordinate Y1 and to produce a substantially horizontal first line segment including the corresponding number of points, said control means further causing said raster scan display device to advance vertically, in turn, to a position corresponding to the Y coordinate for each one of said remainder of the line segments and to produce a substantially horizontal line segment including the number of points corresponding thereto.

2. Apparatus according to claim 1 wherein the means for determining the number of points of said remainder of the line segments further comprises means for adding $2r$ to D and then comparing D with 0 after $2r$ has been added and for, if $D>0$, subtracting $2\Delta Y$ from D and setting modifier equal to 1.

3. Signal generating means for generating signals representative of a straight line between two points $(X_1, Y_1)$, $(X_2, Y_2)$ when $\Delta X \leq \Delta Y$ when $\Delta X > \Delta Y$, where $\Delta X = X_2 - X_1$ and $\Delta Y = Y_2 - Y_1$, on a raster display device, comprising:
  (a) calculating means for calculating the slope $\Delta Y/\Delta X$ of the straight line in terms of a quotient Q and a remainder $(r/\Delta X)$ and first memory means for storing three operating parametrics, Q, $2r$, $2\Delta X$ in three memory registers, respectively, in a first memory location;
  (b) a first means for determining the number of points in a location first line segment of the straight line, where Q is odd by the formula $(Q+1)/2$, where Q is even and $r=0$ by $Q/2$, and where Q is even and r not equal to 0 by $Q/2+1$, and second memory means for storing an X coordinate $X_1$ of the first line segment and the number of points in a second memory location;
  (c) second means for determining the number of points in the remainder of the line segments of the straight line using the formula Q+modifier, wherein for each such line segment the modifier is determined from an error term, D, determined according to the following procedure:
   where Q is odd, $D=r-\Delta X$,
   where Q is even, $D=r-2\Delta Y$,
   and then if $D>0$ the modifier=1 and if $D\leq 0$ the modifier=0;
  (d) third memory means for storing a X coordinate and the number of points for each line segment in additional memory locations; and
  (e) raster display control means responsive to said values stored in said, second and additional memory locations for generating and supplying to the raster display device signals representative of a series of contiguous segments representing said straight line, said control means causing said display device to advance to a point corresponding to coordinate $X_1$ and to produce the first line segment so as to include the corresponding number of points, said control means further causing said raster scan display device to advance vertically, in turn, to a position corresponding to the X coordinate for each one of said remainder of the line segments and to add to said display a line segment having the number of points corresponding thereto.

4. Means according to claim 3 wherein the second means for determining further comprises means for adding $2r$ to D and then comparing D with 0 after $2r$ has been added and for, if $D>0$, subtracting $2\Delta X$ from D and setting modifier equal to 1.

* * * * *